US010275484B2

(12) United States Patent
Bharti et al.

(10) Patent No.: US 10,275,484 B2
(45) Date of Patent: *Apr. 30, 2019

(54) MANAGING SPARSITY IN A MULTIDIMENSIONAL DATA STRUCTURE

(71) Applicant: International Business Machines Corporation, Armonk, NY (US)

(72) Inventors: Vijay Bharti, Jharkhand (IN); Jeremiah Joseph, Pune (IN); Hemant K. Sivaswamy, Pune (IN); Kamalpreet Sapna, Pune (IN); Rohit Jain, Pune (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/947,223

(22) Filed: Jul. 22, 2013

(65) Prior Publication Data
US 2015/0026207 A1  Jan. 22, 2015

(51) Int. Cl.
*G06F 17/30* (2006.01)

(52) U.S. Cl.
CPC .. *G06F 17/30424* (2013.01); *G06F 17/30592* (2013.01); *G06F 17/30595* (2013.01)

(58) Field of Classification Search
CPC ......... G06F 17/30592; G06F 17/30333; G06F 17/30424
USPC ................................ 707/769, 713, 957, 958
See application file for complete search history.

(56) References Cited

U.S. PATENT DOCUMENTS

| 5,761,652 | A  | * | 6/1998  | Wu ................... G06F 17/30324 |
| 5,943,668 | A  | * | 8/1999  | Malloy ............. G06F 17/30595 |
| 6,326,965 | B1 | * | 12/2001 | Castelli ............. G06F 17/30241 |
|           |    |   |         | 345/420 |
| 6,542,895 | B1 | * | 4/2003  | DeKimpe ......... G06F 17/30595 |
| 6,546,395 | B1 | * | 4/2003  | DeKimpe ......... G06F 17/30592 |
| 6,549,907 | B1 | * | 4/2003  | Fayyad ............. G06F 17/30324 |
| 6,601,062 | B1 | * | 7/2003  | Deshpande ....... G06F 17/30457 |
| 6,629,102 | B1 | * | 9/2003  | Malloy ............. G06F 17/30595 |
| 6,665,682 | B1 | * | 12/2003 | DeKimpe ......... G06F 17/30592 |
| 6,898,603 | B1 | * | 5/2005  | Petculescu ........ G06F 17/30902 |
|           |    |   |         | 707/600 |

(Continued)

OTHER PUBLICATIONS

U.S. Appl. No. 14/488,517 entitled, "Managing Sparsity in an Multidimensional Data Structure", filed Sep. 17, 2014.

(Continued)

*Primary Examiner* — Pierre M Vital
*Assistant Examiner* — Nargis Sultana
(74) *Attorney, Agent, or Firm* — Peter J. Hackmann

(57) ABSTRACT

Embodiments of the present invention relate to a method, program product, and system for managing the percentage of unpopulated cells in a multidimensional data structure during the servicing of multidimensional analytical queries. In an embodiment, a multidimensional data structure is stored in a memory location of a computing device, wherein the multidimensional data structure includes a dimension that is a subset of a plurality of dimensions included in a relational database. The computing device determines a frequency of utilization of a dimension to service a multidimensional query request. The computing device combines the dimension with the multidimensional data structure responsive to the frequency of utilization.

10 Claims, 4 Drawing Sheets

(56) References Cited

U.S. PATENT DOCUMENTS

| | | | |
|---|---|---|---|
| 6,980,980 B1* | 12/2005 | Yeh | G06F 17/30395 |
| 7,051,038 B1* | 5/2006 | Yeh | G06F 17/30575 |
| | | | 707/603 |
| 7,392,248 B2* | 6/2008 | Bakalash | C03B 37/02718 |
| 7,747,608 B1* | 6/2010 | Gheorghe | G06F 17/30592 |
| | | | 707/713 |
| 8,219,547 B2 | 7/2012 | Joseph et al. | |
| 2002/0091707 A1* | 7/2002 | Keller | G06F 17/3061 |
| 2003/0115194 A1* | 6/2003 | Pitts | G06F 17/30448 |
| 2003/0131093 A1* | 7/2003 | Aschen | G06Q 10/06 |
| | | | 709/224 |
| 2004/0039736 A1* | 2/2004 | Kilmer | G06F 17/30427 |
| 2004/0093412 A1* | 5/2004 | Chen | G06Q 10/10 |
| | | | 709/224 |
| 2004/0193576 A1* | 9/2004 | Petculescu | G06F 17/30592 |
| 2004/0215626 A1* | 10/2004 | Colossi | G06F 17/30312 |
| 2004/0243607 A1* | 12/2004 | Tummalapalli | H04L 41/5009 |
| 2005/0076036 A1* | 4/2005 | Le | G06F 17/30592 |
| 2005/0283459 A1* | 12/2005 | MacLennan | G06F 17/30592 |
| 2005/0283488 A1* | 12/2005 | Colossi | G06F 17/30592 |
| 2006/0010113 A1* | 1/2006 | Berger | G06F 17/30418 |
| 2006/0116984 A1* | 6/2006 | Zurek | G06F 17/30592 |
| 2006/0149778 A1* | 7/2006 | Clover | G06F 17/30592 |
| 2007/0088689 A1* | 4/2007 | Cras | G06F 17/30398 |
| 2009/0006049 A1* | 1/2009 | Lightstone | G06F 17/30312 |
| | | | 703/2 |
| 2009/0089306 A1* | 4/2009 | Bhattacharjee | G06F 17/30306 |
| 2009/0177667 A1* | 7/2009 | Ramos | G06F 17/30457 |
| 2009/0287666 A1* | 11/2009 | DeKimpe | G06F 17/30592 |
| 2010/0169759 A1* | 7/2010 | Le Brazidec | G06F 17/246 |
| | | | 715/219 |
| 2010/0235345 A1* | 9/2010 | Joseph | G06F 17/30457 |
| | | | 707/713 |
| 2010/0274756 A1* | 10/2010 | Inokuchi | G06F 17/30592 |
| | | | 707/602 |
| 2010/0287135 A1* | 11/2010 | Bruland | G06F 17/30554 |
| | | | 707/600 |
| 2011/0119281 A1* | 5/2011 | Joslyn | G06F 17/30572 |
| | | | 707/754 |
| 2012/0005153 A1* | 1/2012 | Ledwich | G06Q 10/06 |
| | | | 707/602 |
| 2012/0130940 A1* | 5/2012 | Gattani | G06F 17/30592 |
| | | | 707/600 |
| 2012/0260045 A1* | 10/2012 | Adams | G06F 17/30592 |
| | | | 711/144 |
| 2012/0323885 A1* | 12/2012 | Wang | G06F 17/30448 |
| | | | 707/714 |
| 2013/0035985 A1* | 2/2013 | Gilbert | G06Q 10/06375 |
| | | | 705/7.31 |
| 2013/0254155 A1* | 9/2013 | Thollot | G06F 17/30528 |
| | | | 707/602 |
| 2013/0275685 A1* | 10/2013 | Barbas | G06F 17/3048 |
| | | | 711/137 |
| 2014/0280372 A1* | 9/2014 | Huras | G06F 17/30584 |
| | | | 707/803 |

OTHER PUBLICATIONS

Chun et al.; "Dynamic Update Cube for Range-Sum Queries"; Proceedings of the 27th VLDB Conference; Roma, Italy; 2001.

Kanaracus, Chris; "SAP's In-memory Analytics Boxes Set for November Release"; Printed Apr. 8, 2013; <http://www.pcworld.com/article/208160/article.html>.

Lakshmanan et al.; "What-if OLAP Queries with Changing Dimensions".

Leonhardi et al.; "Augmenting OLAP Exploration with Dynamic Advanced Analytics"; EDBT 2010; Mar. 22-26, 2010; Lausanne, Switzerland; Copyright 2010.

Simmons et al.; "Best practice: Optimizing the cube build process ion SAS 9.2"; Paper 319-2009.

"Proactive Caching (Partitions)"; Copyright 2013 Microsoft; Printed Apr. 8, 2013; <http://msdn.microsoft.com/en-us/library/ms174769.aspx>.

* cited by examiner

MANAGING SPARSITY IN A MULTIDIMENSIONAL DATA STRUCTURE

BACKGROUND

The present disclosure relates generally to the field of multidimensional analytical queries, and more particularly to managing the percentage of unpopulated cells in a multidimensional data structure during the servicing of multidimensional analytical queries. Transforming data into meaningful and useful information, for example, to locate historic trends, sometimes requires the analysis of a large data set. Multidimensional analysis is a statistical technique that can decrease the time required to analyze a large data set. One approach to servicing multidimensional analytical queries swiftly involves Online Analytical Processing (hereinafter "OLAP") systems, which is technology that is used to create decision support software. OLAP utilizes information that has been summarized into multidimensional views and hierarchies which are readily available for detailed queries and analytics.

Central to the OLAP process are cubes, which are not cubes in the traditional sense, but are pre-determined hierarchical, multidimensional arrays that are stored in memory. Unlike relational databases that use two-dimensional data structures (often in the form of columns and rows in a spreadsheet), OLAP cubes are logical, multidimensional data structures that can have numerous dimensions and levels of data. A cube that includes more than three (3) dimensions is referred to as a hyper-cube. OLAP systems are built using a three-tier architecture, wherein the first or client tier provides a graphical user interface or other application, the second or middle tier provides a multidimensional view of the data, and the third or server tier comprises a relational database management system that stores the data.

Different cubes can be used for different types of data and queries. An OLAP cube stores data in a method that enables fast retrieval of summarized data. Data summarization in this context means condensing large amounts of data into meaningful numbers such as counts, sums, averages, or other statistical measures. The structure of a cube is hierarchical in nature and is derived from the associations between the different columns and rows of data in a data source. In theory, an OLAP cube is an abstract representation of a projection of a relational database management system relation that is pre-computed and cached for faster query servicing. OLAP cubes are comprised of dimensions, levels, hierarchies, members, and member properties. This structure enables you to easily select data subsets and navigate the cube structure when querying the cube.

Selecting data subsets can result in selecting a dimension that is not completely populated by statistical measures, which can lead to an increase in the number of unpopulated cells in the resulting cube (hereinafter "sparsity"). As the degree of sparsity in a cube increases the time required to query the cube increases.

SUMMARY

Embodiments of the present invention relate to a method, program product, and system for managing the percentage of unpopulated cells in a multidimensional data structure during the servicing of multidimensional analytical queries. In an embodiment, a multidimensional data structure is stored in a memory location of a computing device, wherein the multidimensional data structure includes a dimension that is a subset of a plurality of dimensions included in a relational database. The computing device determines a frequency of utilization of a dimension to service a multidimensional query request. The computing device combines the dimension with the multidimensional data structure responsive to the frequency of utilization.

DETAILED DESCRIPTION

Figure 1:
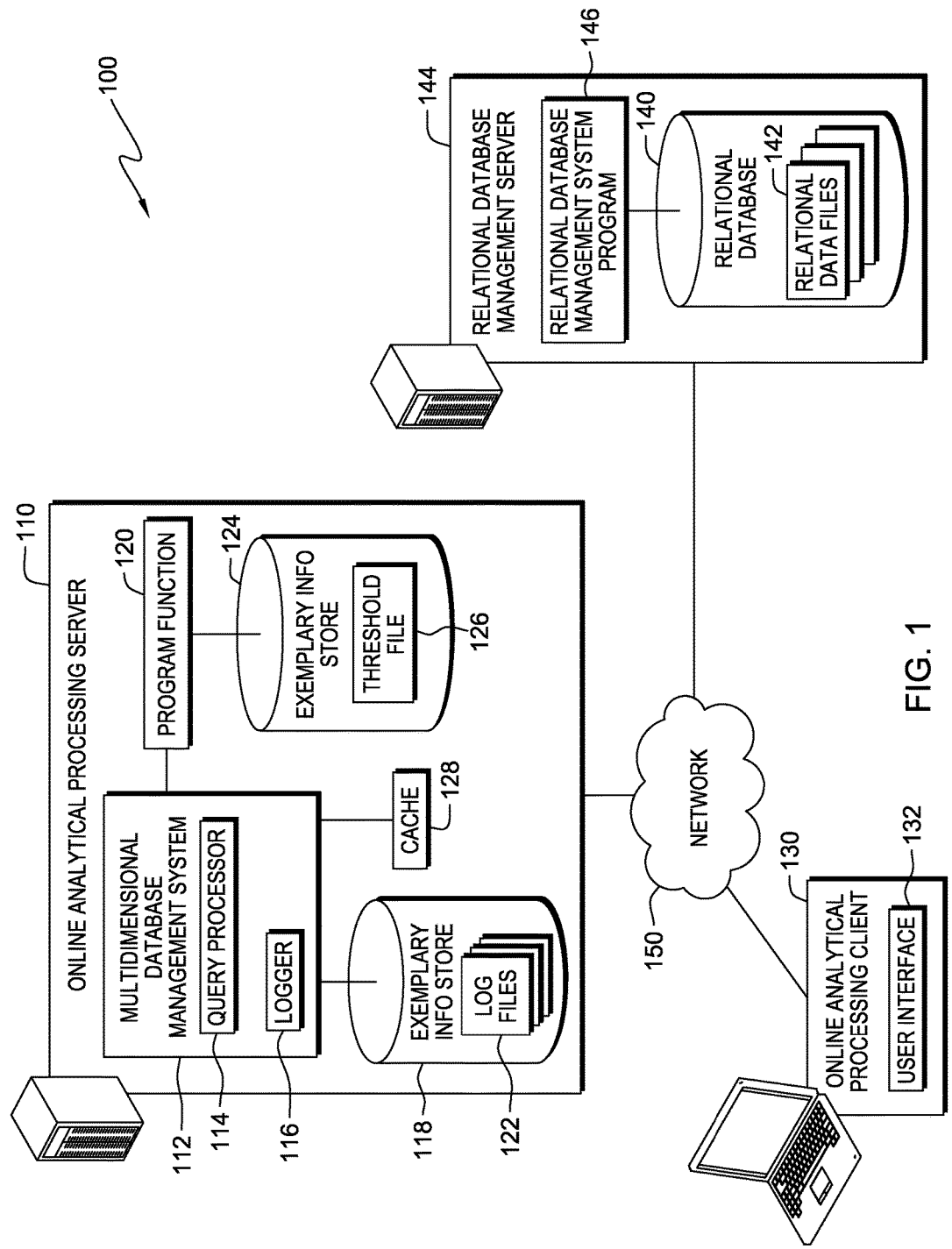
FIG. 1 is a block diagram illustrating an environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the Figures. FIG. 1 is a block diagram illustrating an environment, generally designated 100, in accordance with one embodiment of the present invention.

Environment 100 includes online analytical processing (hereinafter "OLAP") client 130, relational database management server 144, and OLAP server 110, all interconnected over network 150. OLAP is an approach to servicing multidimensional analytical queries. A multidimensional analysis attempts to provide meaningful and useful information, such as locating historic trends, included in large data sets. In the OLAP approach to multidimensional analysis, the data is physically stored in a multidimensional data structure, which speeds the analysis. The multidimensional data structure utilized in the OLAP approach is called a cube, if it includes three (3) dimensions, or a hyper-cube, if it contains more than three (3) dimensions. A dimension is a structural attribute of the cube that lists all members of a particular type, for example, a time dimension may include all time-related members, such as months, quarters, years, etc. The dimension acts as an index for identifying values within the multidimensional data structure. Network 150 can be, for example, a local area network (LAN), a wide area network (WAN) such as the Internet, or a combination of the two, and can include wired, wireless, or fiber optic connections. In general, network 150 can be any combination of connections and protocols that will support communications between OLAP server 110, relational database management server 144, and OLAP client 130, in accordance with an embodiment of the present invention.

In various embodiments of the present invention, OLAP client 130, relational database management server 144, and OLAP server 110 may be a laptop computer, tablet computer, netbook computer, personal computer (PC), a desktop computer, a personal digital assistant (PDA), or a smart phone. OLAP client 130 is in communication with OLAP server 110 and relational database management server 144 via network 150. OLAP client 130 is a computing device that allows a user to generate and transmit multidimensional query requests. OLAP client 130 includes user interface 132, which is a graphical and/or text-based user interface. User interface 132 allows the user of OLAP client 130 to generate and transmit multidimensional query requests to OLAP server 110. In an embodiment, user interface 132 displays multidimensional query results received from OLAP server 110. OLAP client 130 exchanges information with OLAP server 110 using an appropriate application programming interface, such as an OLAP application programming interface.

Relational database management server 144 is in communication with OLAP server 110 and OLAP client 130 via network 150. Relational database management server 144 is a computing device that provides relational database management services, in accordance with an embodiment of the present invention. Relational databases store data in the form of related tables. Relational database management server 144 includes relational database management system program 146, which is software that is used to define, create, query, update, and administer data included in relational databases, such as relational database 140. Relational database management system program 146 includes relational database 140, which is an information repository that stores data in array-like data structures (hereinafter "dimensions").

Relational database 140 includes relation data files 142. Relational data files 142 include data and dimensions. In an embodiment, relational data files 142 includes data derived from a data source using an appropriate extract, transform, and load process. In an embodiment, dimensions included in relational data files 142 are array-like data structures that included a plurality of cells. Dimensions included in relation data files 142 are structural attributes of a multidimensional data structure, such as OLAP cubes or hyper-cubes, which lists all members of a particular type, for example, a time dimension may include all time-related members, such as months, quarters, years, etc. Dimensions act as an index for identifying values within multidimensional data structures.

Although each cell included in the multidimensional data structure can include data, they may not always do so. The degree to which the cells in a dimension are unpopulated is called the dimension's sparsity. Dimensions included in relational data files 142 have a cardinality, which defines the number of cells that are included in the dimension that include data. Relational database management system program 146 transmits, via network 150, predefined dimensions included in relational data files 142 to multidimensional database management system 112 for storage in cache 128 (discussed below) by multidimensional database management system 112. In an embodiment, the dimensions included in relational data files 142 are stored in cache 128 by multidimensional database management system 112 in the form of a multidimensional data structure, for example, an OLAP cube or hyper-cube. OLAP cubes are multidimensional arrays of data that include zero (0) or more dimensions, for example, product, time, city, and scenario. In theory, an OLAP cube is an instance of a projection of a relational database management system relation. For example, given a relation of order N, consider a projection that subtends X, Y, and Z as the key and W as the residual attribute, which yields function [1].

$$f:(X,Y,Z) \to W \qquad [1].$$

Attributes X, Y, Z correspond to the axes of the OLAP cube and W is the value into which each (X, Y, Z) triple maps correspond to the data element that populates each cell of the OLAP cube.

Relational database management system program 146 can update (hereinafter "refresh") OLAP cubes stored in cache 128 with current data and/or additional dimensions, wherein the updated OLAP cubes includes additional dimensions (hereinafter "refreshed OLAP cube"). In general relational database management system program 146 can be any software capable of managing a relational database, in accordance with an embodiment of the present invention.

OLAP server 110 is in communication with relational database management server 144 and OLAP client 130 via network 150, in accordance with an embodiment of the present invention. OLAP server 110 is a computing device that services multidimensional query requests. OLAP server 110 includes cache 128, multidimensional database managing system (hereinafter "MDBMS") 112, exemplary information store 118, program function 120, and exemplary information store 124, in accordance with an embodiment of the present invention. MDBMS 112 may also include internal and external hardware components, as depicted and described in further detail with respect to FIG. 4. MDBMS 112 can refresh a multidimensional data structure included in cache 128 according to a predefined schedule, such as monthly, weekly, daily, and hourly. The data analyzed in a multidimensional OLAP analysis is historic data that changes periodically, which can require that the OLAP cube that was generated using the older version of the data also needs to be refreshed periodically in order to produce a reliable analysis.

Cache 128 is memory. In an embodiment, cache 128 is included in cache 416. OLAP cubes and hyper-cubes are stored in cache 128, for example, by MDBMS 112. Cached OLAP cubes included in cache 128 are used by query processor 114 to service multidimensional query requests transmitted, via network 150, by OLAP client 130.

Exemplary information store 118 is in communication with MDBMS 112. Exemplary information store 118 is an information repository that includes log files 122. Log files 122 are files that include metrical information related to dimensions included in cache 128 and/or relational files 142. In an embodiment, the metrical information included in log files 122 includes usage information that reflects how many times dimensions have been accessed since the OLAP cube included in cache 128 was last generated by, for example, MDBMS 112. Log files 122 are generated by logger 116, which is included in MDBMS 112. In another embodiment, log files 122 include usage log data for cached and un-cached dimensions, for example, those dimensions included in cache 128 and relational data files 142, respectively, that reflects how many times those dimensions were used to service multidimensional query requests since the cube's initial load or last refresh.

Query processor 114 is included in MDBMS 112. Query processor 114 is software that services multidimensional query requests, in accordance with an embodiment of the present invention. A multidimensional query is a query that is serviced using multidimensional data. In an embodiment, query processor 114 queries multidimensional query requests using multidimensional OLAP analysis. Query processor 114 services multidimensional query requests drafted in a query language, such as the Multidimensional Expressions query language and Structured Query Language. Multidimensional Expressions query language is a query language that allow one to access, retrieve, and manipulate multidimensional data, such as the data included in an OLAP cube or hyper-cube. Query processor 114 services multidimensional query requests transmitted by OLAP client 130 via network 150 by accessing and manipulating the OLAP cube or hyper-cube included in cache 128, according to information included in the multidimensional query request.

Program function 120 is in communication with MDBMS 112 and exemplary information store 124, in accordance with an embodiment of the present invention. Exemplary information store 124 is an information repository that includes threshold file 126, which include information reflective of a predefined value or range. In an embodiment, threshold log file 126 is defined by a user, for example, the user of OLAP client 130. In an embodiment, threshold log file 126 includes a cardinality threshold value or range used by program function 120 to categorize the cardinality of dimensions included in cache 128 and/or relational data files 142. In another embodiment, cardinality dimension categories used by program function 120 to categorize the cardinality of dimensions include low, medium, and high.

Program function 120 is software that manages sparsity in a multidimensional data structure, in accordance with an embodiment of the present invention. Multidimensional data structures, such as OLAP cubes and hyper-cubes, include dimensions that act as axes for the data structure. Wherein each dimension includes cells that are uniquely defined by the dimensions that intersect that cell. Each cell can include a fact, which includes values, ratios, and descriptions. Sparsity is a measurement of the percentage of cells that are included in a dimension that include no facts. In the OLAP approach to multidimensional analysis, the time required to process a multidimensional query increases as the sparsity of the dimensions included in the cube or hyper-cube, increases. Program function 120 accesses, via MDBMS 112, information included in exemplary information store 118, such as log files 122. Program function 120 accesses, via MDBMS 112, information included in exemplary information store 124, such as threshold file 126.

Program function 120 instructs MDBS 112 to re-generate an OLAP cube or hypercube that is included in cache 128. In an embodiment, program function 120 determines the cardinality of dimensions included in cache 128 and/or relational data files 142. In an embodiment, the cardinality of a dimension is the measure of the total number of different element types included in the dimension. Program function 120 categorizes dimensions included in relational data files 142 by cardinality according to a predefined cardinality threshold value or range included in threshold file 126. Program function 120 utilizes threshold files 126 to manage the size of the initial cube or hyper-cube generated by MDBMS 112 and stored in cache 128. In an embodiment, program function 120 determines the frequency of utilization of dimensions in order to service multidimensional query requests. In yet another embodiment, program function 120 instructs MDMS 112 to combine dimensions with a multidimensional data structure, such as a multidimensional data structure included in cache 128, responsive to the frequency of utilization.

In yet still another embodiment, the frequency of utilization are statistics of utilization of the dimensions to service multidimensional query requests, such as the multidimensional query requests received from OLAP client 130. For example, program function 120 computes the statistics of utilization for the life of the multidimensional data structure stored in cache 128. In some embodiments, program function 120 updates the statistics of utilization each time a multidimensional query request is serviced, for example, by query processor 114. The multidimensional data structure may be updated during refresh based on the frequency of utilization of the dimensions.

In an embodiment, threshold file 126 includes the cardinality threshold value or range that generates an OLAP cube or hyper-cube that can be used to service a large portion. For example, the categories utilized to categorize a dimension that has a cardinality that is below, within, or higher than the predefined cardinality threshold value or range include in threshold file 126.

Figure 2:
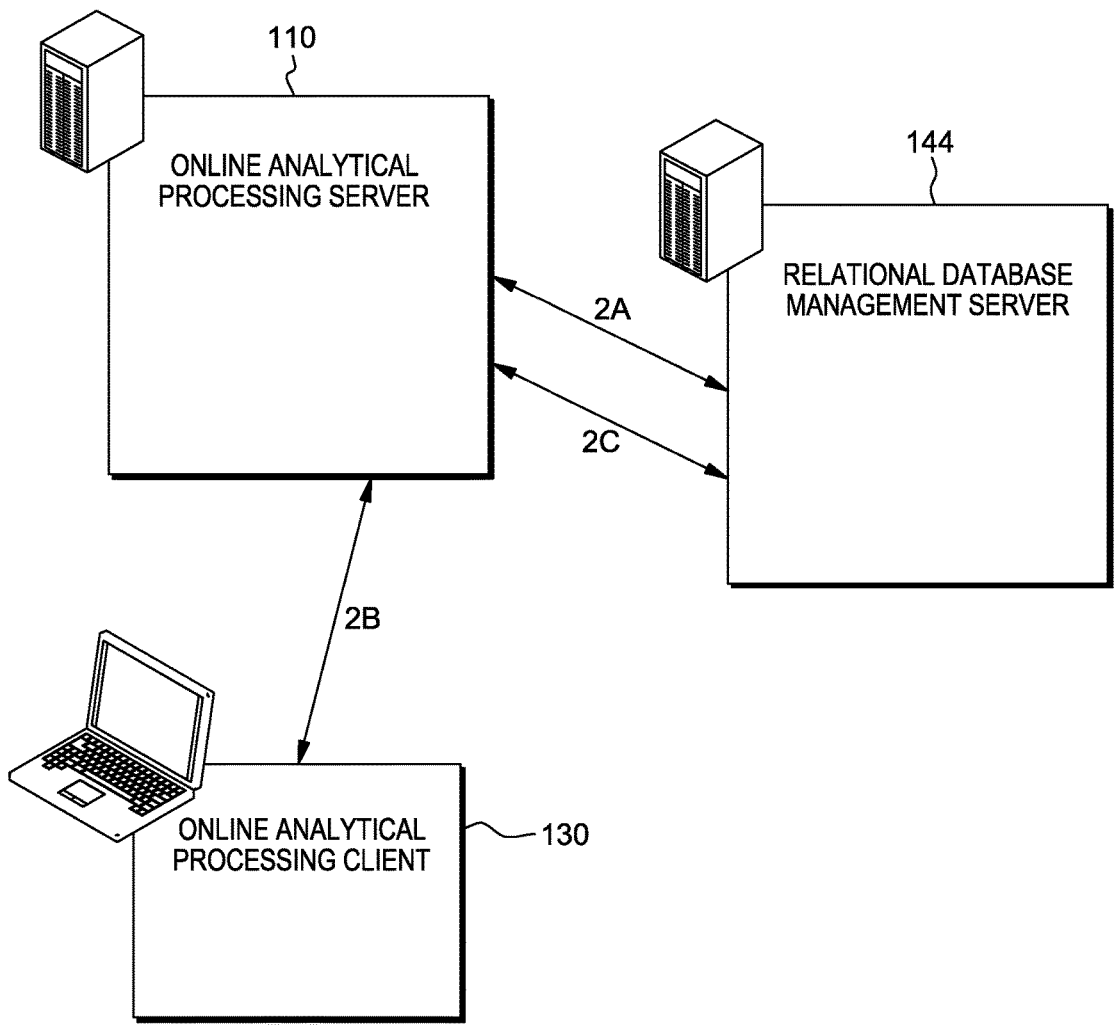
FIG. 2 is a depiction of request/response cycles involving the server, client, and data store of FIG. 1, in accordance with an embodiment of the present invention.

Concepts introduced in the following discussion of FIG. 2 will be used further in the discussion of FIG. 3 in the context of environment 100 of FIG. 1. FIG. 2 illustrates an embodiment of the present invention wherein sparsity in an OLAP cube is managed in the course of servicing multidimensional query requests. Program function 120 manages the level of sparsity in an OLAP cube or hyper-cube by restricting the size of the initial OLAP cube or hyper-cube generated by MDBMS 112 (hereinafter "initial load") and refreshing that cube to also include those un-cached dimensions that were utilized by query processor 114 to service multidimensional query requests more often than cached dimensions included in cache 128 since the cube was last refreshed. By managing the OLAP cube's initial load and its refreshing process, program function 120 manages the sparsity of the cube.

FIG. 2 is a depiction of request/response cycles (hereinafter "cycle") that involves OLAP server 110, relational database management server 144, and OLAP client 130, in accordance with an embodiment of the present invention. In particular, cycle 2A represents a call/response cycle involving OLAP client 130 and OLAP server 110. Cycle 2A initiates when program function 120 instructs MDBMS 112 to transmit a request to relational database management system program 146 for all dimensions included in relational data files 142 that have a particular cardinality, for example, a cardinality equal to the threshold range and/or value included in threshold file 126. For example, relational data files 142 includes dimensions product, store, and time, which all have a cardinality equal to the threshold range and/or value included in threshold file 126. The product dimension identifies all company products, the store dimension indicates all company stores, and the time dimension indicates all time values, such as, all years, months, weeks, days, hours, minutes, and seconds.

Cycle 2A concludes when, in response to receiving the request transmitted by OLAP server 110, relational database management system program 146 transmits the dimensions product, store, and time to MDBMS 112 for storage in cache 128. Once in cache 128, query processor computes the dimensions by a measure, for example, sales. A measure is a database object, which is a calculation, rule, or other expression for manipulating the data included in a multidimensional database. For example, the sales computation includes sales by product, store, and date; sales by, product and store; sales by product and date; sales by store and date; sales by product; sales by store; sales by date; and overall sales. In another embodiment, MBDMS 112 executes the above computations in response to receiving a multidimensional query request transmitted by OLAP client 130, via network 150.

Cycle 2B initiates in response to OLAP client 130 transmitting, via network 150, a multidimensional query request to MDBMS 112. For example, a user of OLAP client 130 utilizes user interface 132 to generate a multidimensional query request to analyze sales for products ABC, DEF, and GHI in the mid-west of the United States from 2002 to 2008. The user also uses user interface 132 to instruct OLAP client 130 to transmit the multidimensional query request to MBDMS 112, via network 150. In response to receiving the multidimensional query request, query processor 114 services the multidimensional query request using the dimensions that are stored in cache 128 in the form of an OLAP hyper-cube. For example, Query processor 114 services the multidimensional query request transmitted by OLAP client 130 using the appropriate protocols.

If query processor 114 can not service the multidimensional query request using the cached dimensions stored in cache 128, then query processor 114 initiates cycle 2C and services the multidimensional query request using dimensions included relational database files 142. For example, the time dimension required to service the received multidimensional query request was not included in the cube's initial load because its cardinality was not equal to the predefined cardinality threshold value or range included in threshold file 126. Hence, to service the received multidimensional query request, query processor 114 must request the time dimension from relational data files 142. Cycle 2C concludes upon query processor 114 servicing the multidimensional query request using dimensions included in relational data files 142. Logger 116 records each time a dimension included in cache 128 and/or relational data files 142 is utilized by query processor 114 to service a multidimensional query request transmitted by OLAP client 130. Cycle 2B concludes when MDBMS 112 transmits the serviced multidimensional query request to OLAP client, via network 150.

In an embodiment, if query processor 114 services a multidimensional query request utilizing any other OLAP cube and hyper-cube than the initially loaded OLAP cube or hyper-cube or a refreshed version thereof, then MBDMS 112 deletes that cube or hyper-cube. Since the data included in dimensions is usually historic data, OLAP cubes based on such data must be refreshed periodically in order to reflect those changes. To increase cache hit rates, which refers to whether requested data is included in cache 128, program function 120 instructs MBDMS 112 to refresh the initially-loaded OLAP cube or hyper-cube with those un-cached dimensions included in relational data files 142 have were utilized by MDBMS 112 to service multidimensional query requests more often than cached dimensions included in the OLAP cube or hyper-cube that is stored in cache 128 since the initially-loaded OLAP cube or a refreshed version thereof was last refreshed.

In an embodiment, upon the conclusion of cycle 2B MDBMS 112 updates the cached dimensions included in cache 128 to include those un-cached dimensions included in relational data files 142 that were utilized by MDBMS 112 to service multidimensional query requests at a higher rate than the cached dimensions included in cache 128. For example, upon the conclusion of cycle 2B, MDBMS 112 access log files 122 and determines which un-cached dimensions included in relational data files 142 have been utilized by MDBMS 112 more than the least utilized cached dimension included in cache 128. Subsequently, MDBMS 112 transmits a request for the determined un-cached dimensions to relational database program management system program 146 and stores the determined un-cached dimension in cache 128 upon receipt of the un-cached dimensions transmitted by relation database management system program 146.

Figure 3:
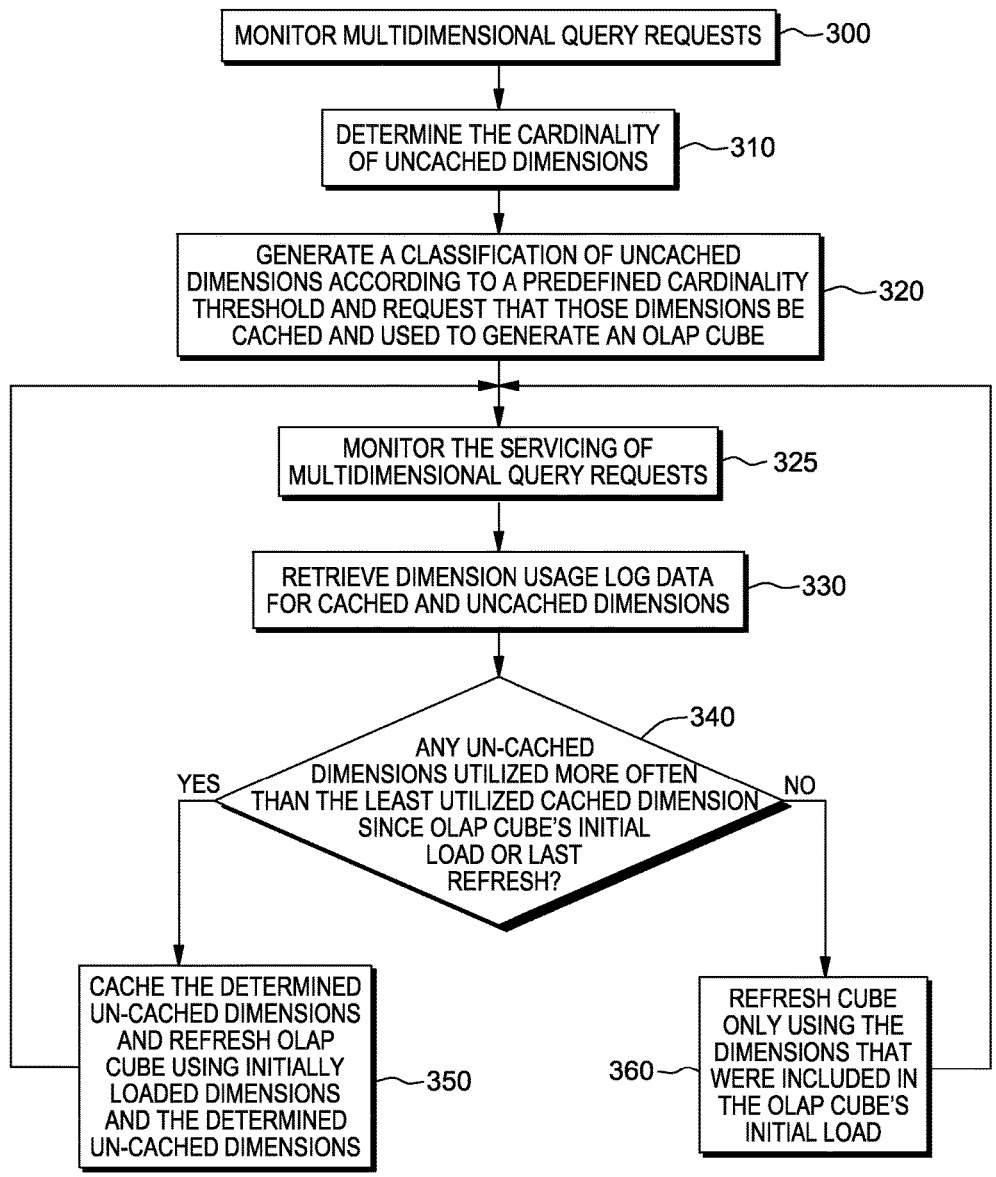
FIG. 3 is a flowchart depicting operational steps of the program function of FIG. 1, in accordance with an embodiment of the present invention.

FIG. 3 is a flowchart depicting operational steps of program function 120 for managing sparsity in an OLAP cube, in accordance with an embodiment of the present invention. Program function 120 monitors multidimensional query requests received by the query OLAP server (step 300). Program function 120 determines the cardinality of un-cached dimensions (step 310). Program function 120 generates a classification for un-cached dimensions according to a predefined cardinality threshold or value and requests that dimensions of a particular classification be cached and used for the OLAP cube's initial load (step 320). Program function 120 monitors the servicing of multidimensional query requests (step 325). Program function 120 retrieves usage log data for cached and un-cached dimensions (step 330).

Program function 120 determines whether any un-cached dimensions were utilized more often than the least utilized cached dimension in servicing multidimensional query requests since the cube's initial load or last refresh (decisional 340). If program function 120 determines that an un-cached dimension was utilized more often than the least utilized cached dimension to service multidimensional query requests since the OLAP cube's initial load or last refresh ("yes" branch decisional 340), then program function 120 instructs the multidimensional database management system to cache the determined un-cached dimensions and refresh the OLAP cube using the initially loaded dimensions and the determined un-cached dimensions (step 350) and returns to step 325. If program function 120 determines that no un-cached dimension were utilized more than the least utilized cached dimension to service multidimensional query requests since the OLAP cube's initial load or last refresh ("no" branch decisional 340), then program function 120 instructs the multidimensional database management system to refresh the OLAP cube only using the dimensions that were included in the OLAP cube's initial load (step 360) and returns to step 325.

Figure 4:
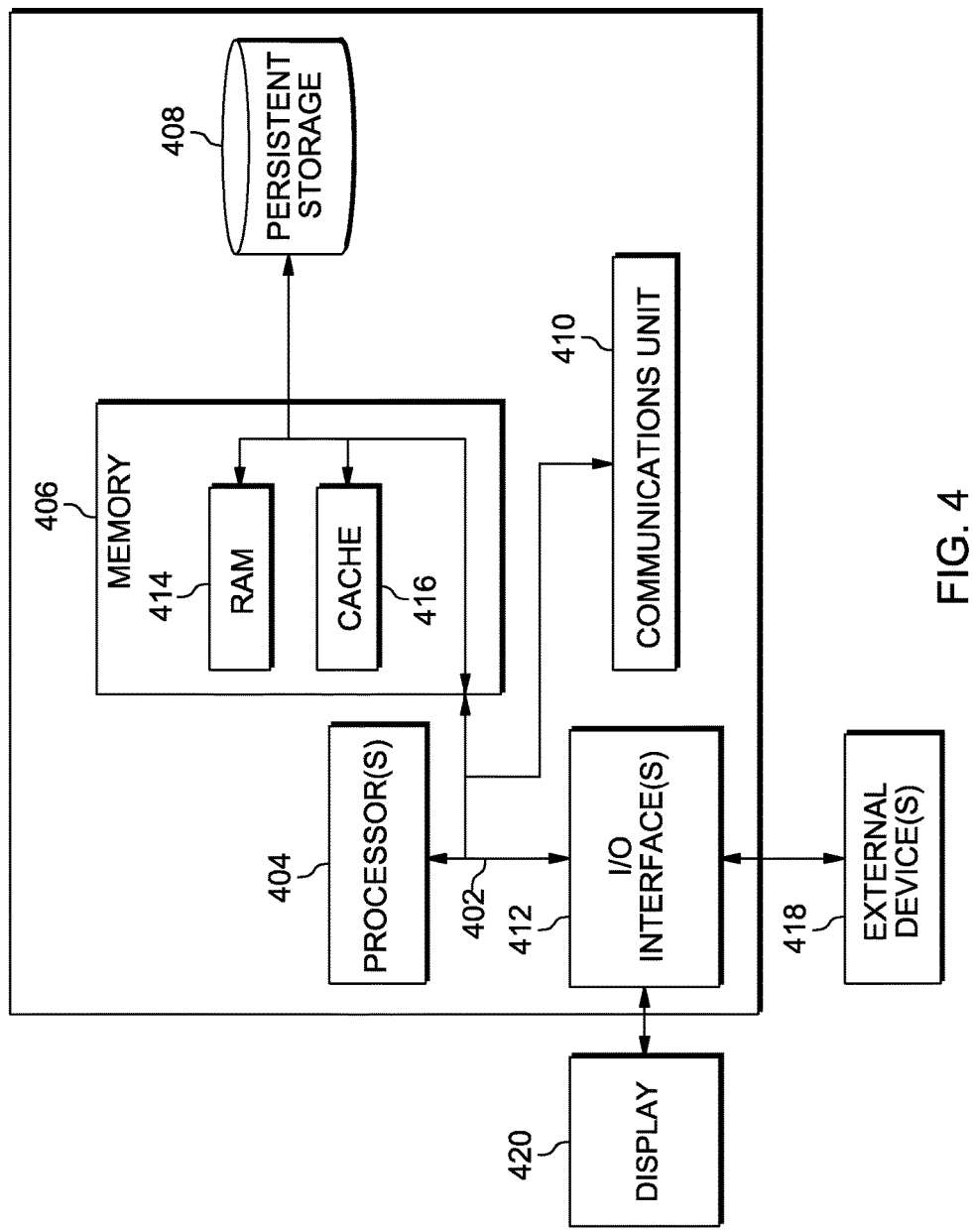
FIG. 4 depicts a block diagram of components of the OLAP server of FIG. 1, in accordance with an embodiment of the present invention.

FIG. 4 depicts a block diagram of components of OLPA server 110 of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

OLAP server 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

MDBMS 110, program function 120, and exemplary information stores 118 and 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including OLAP client 130. In these examples, communications unit 410 includes one or more network interface cards. Communications unit 410 may provide communications through the use of either or both physical and wireless communications links. Program function 120 and MDBMS 112 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., program function 120 and MDBMS 112, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product, the computer program product comprising a non-transitory computer readable storage medium having program code embodied therewith, the program code executable by a processor to:
   determine a set of dimensions within a relational database to be stored in a cache, the set of dimensions having a historical access frequency meeting a pre-defined cardinality threshold of data-containing cells;
   responsive to determining the set of dimensions, restricting an initial load to a size below a threshold size by causing a multidimensional database management system to generate the initial load using only the set of dimensions having a historical access frequency meeting a pre-defined cardinality threshold of data-containing cells;
   at predetermined time intervals, retrieve log files including usage information for individual dimensions in the set of dimensions stored in a cache and in uncached dimensions stored in a relational database, the usage information corresponding to a level of usage of the individual dimensions;
   at the predetermined time intervals, determine at least one relatively high usage dimension in the uncached dimensions based, at least in part, upon the usage information; and
   at the predetermined time intervals, causing the multidimensional database management system to refresh, in a memory device, the initial load using only a portion of the set of dimensions and the at least one relatively high usage dimension in the uncached dimensions from the usage information in the log files, the refreshing action generating an incremental load to be stored in the cache.

2. The computer program product of claim 1 wherein:
   the initial load and the incremental load are in the form of online analytical processing (OLAP) structure; and
   the program code is further executable by a processor to:
   selectively provide access to the OLAP structure and to the relational database.

3. The computer program product of claim 2 wherein the selective provision of access to the OLAP structure and to the relational database includes:
   on condition that the data sought to be accessed is included exclusively in the at least one relatively high usage dimension, access is provided by accessing the OLAP structure using a Multidimensional Expressions mode query; and
   on condition that the data sought to be accessed is not included exclusively in the at least one relatively high usage dimension, access is provided by accessing the relational database using an SQL (structured query language) mode query.

4. A system comprising:
   a processor(s) set; and
   a storage device;
   wherein:
   the processor set(s) is operatively connected to the storage device so that the processor(s) set can execute program code stored on and/or in the storage device;
   the program code is executable by the processor(s) set to:
   determine a set of dimensions within a relational database to be stored in a cache, the set of dimensions having a historical access frequency meeting a pre-defined cardinality threshold of data-containing cells;
   responsive to determining the set of dimensions, restricting an initial load to a size below a threshold size by causing a multidimensional database management system to generate the initial load using only the set of dimensions having a historical access frequency meeting a pre-defined cardinality threshold of data-containing cells;
   at predetermined time intervals, retrieve log files including usage information for individual dimensions in the set of dimensions stored in a cache and in uncached dimensions stored in a relational database, the usage information corresponding to a level of usage of the individual dimensions;
   at the predetermined time intervals, determine at least one relatively high usage dimension in the uncached dimensions based, at least in part, upon the usage information; and
   at the predetermined time intervals, causing the multidimensional database management system to refresh, in a memory device, the initial load using only a portion of the set of dimensions and the at least one relatively high usage dimension in the uncached dimensions from the usage information in the log files, the refreshing action generating an incremental load to be stored in the cache.

5. The system of claim 4 wherein:
   the initial load and the incremental load are in the form of online analytical processing (OLAP) structure; and
   the program code is further executable by the processor(s) set to:
   selectively provide access to the OLAP structure and to the relational database.

6. The system of claim 5 wherein the selective provision of access to the OLAP structure and to the relational database includes:
   on condition that the data sought to be accessed is included exclusively in the at least one relatively high usage dimension, access is provided by accessing the OLAP structure using a Multidimensional Expressions mode query; and
   on condition that the data sought to be accessed is not included exclusively in the at least one relatively high usage dimension, access is provided by accessing the relational database using an SQL (structured query language) mode query.

7. The computer program product of claim 1, wherein the initial load is an initial online analytics processing (OLAP) cube.

8. The computer system of claim 4, wherein the initial load in an initial online analytics processing (OLAP) cube.

9. The computer program product of claim 2, wherein the historical access frequency is based on log files including usage information that reflects how many times dimensions in the set of dimensions has been accessed since the OLAP structure was last generated.

10. The computer system of claim 5, wherein the historical access frequency is based on log files including usage information that reflects how many times dimensions in the set of dimensions has been accessed since the OLAP structure was last generated.

* * * * *